US009821423B2

(12) United States Patent
Deininger et al.

(10) Patent No.: US 9,821,423 B2
(45) Date of Patent: Nov. 21, 2017

(54) CLAMPING UNIT, IN PARTICULAR FOR USE IN A MACHINING CENTER, OR A TURNING OR MILLING CENTER

(71) Applicant: SMW-AUTOBLOK Spannsysteme GmbH, Meckenbeuren (DE)

(72) Inventors: Harald Deininger, Friedrichshafen (DE); Eckhard Maurer, Oberteuringen (DE)

(73) Assignee: SMW-AUTOBLOK SPANNSYSTEME GMBH, Meckenbeuren (DE)

( * ) Notice: Subject to any disclaimer, the term of this patent is extended or adjusted under 35 U.S.C. 154(b) by 562 days.

(21) Appl. No.: 14/459,669

(22) Filed: Aug. 14, 2014

(65) Prior Publication Data

US 2015/0048565 A1 Feb. 19, 2015

(30) Foreign Application Priority Data

Aug. 16, 2013 (EP) ..................................... 13180673

(51) Int. Cl.
*B23Q 3/06* (2006.01)
*B23Q 1/26* (2006.01)
(Continued)

(52) U.S. Cl.
CPC ................ *B23Q 3/06* (2013.01); *B23B 31/28* (2013.01); *B23Q 1/0009* (2013.01); *B23Q 1/26* (2013.01);
(Continued)

(58) Field of Classification Search
CPC ................ B23B 31/28; B23B 2260/11; B23B 2260/062; B23B 2260/136;
(Continued)

(56) References Cited

U.S. PATENT DOCUMENTS 3,998,108 A * 12/1976 Vyskocil ................... F16H 1/16
   116/303
4,700,936 A * 10/1987 Lunn ......................... B25B 1/18
   269/226

(Continued)

FOREIGN PATENT DOCUMENTS

DE   21 17 550   10/1972
DE   35 46 252   7/1987
(Continued)

OTHER PUBLICATIONS

Multi Drive Power Flange F500 from SMW-AUTOBLOK; www.smw-autoblok.de.*

(Continued)

*Primary Examiner* — Larry E Waggle, Jr.
*Assistant Examiner* — Mahdi H Nejad
(74) *Attorney, Agent, or Firm* — Foley & Lardner LLP

(57) ABSTRACT

A clamping unit, in particular for use in a machining center, or a turning or milling center, wherein the clamping unit comprises an external housing (12), preferably having a cylindrical basic design, an internal housing (15) accommodated in the external housing (12), and an internal cylinder (11) that is retained in the internal housing (15) such that it can be displaced in a vertical adjustment direction A when in the operating state, which is designed for transferring a pressure or tensile force for clamping purposes, wherein the internal housing (15) is supported in the external housing (12) by means of springs (13, 14), and is supported with respect to the external housing (12) such that it can be displaced in the adjustment direction A, and thus forms a spring force storage unit (21), and wherein an electric motor (16) is disposed inside the clamping unit, integrated therein, preferably encompassed by the external housing (12), furthermore, preferably accommodated inside the internal housing (15), in order to apply a force in the adjustment (Continued)

Figure 1:
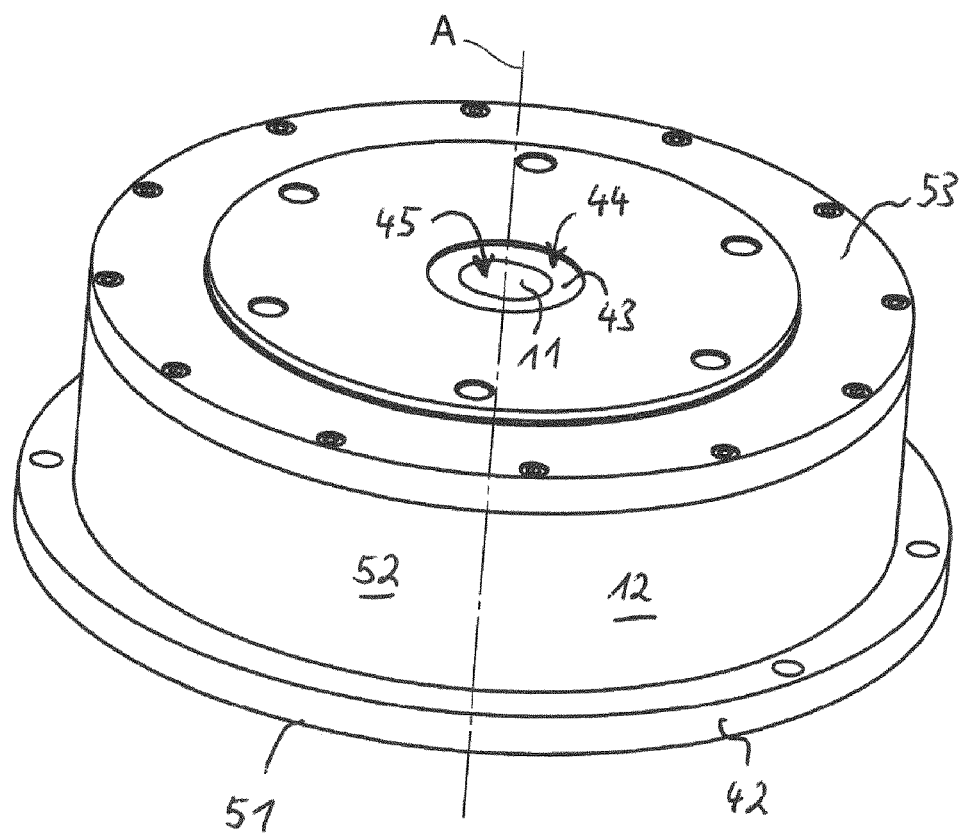

direction A to the internal cylinder (11) via drive means (17-20) disposed therein.

25 Claims, 5 Drawing Sheets

(51) Int. Cl.
*B23Q 1/00* (2006.01)
*B23B 31/28* (2006.01)

(52) U.S. Cl.
CPC ..... *B23B 2260/11* (2013.01); *B23B 2260/136* (2013.01); *B23B 2260/158* (2013.01); *Y10T 279/27* (2015.01)

(58) Field of Classification Search
CPC ........ B23B 2260/158; B23B 31/16229; B23Q 3/06; B23Q 1/0009; B23Q 1/26; Y10T 279/27
USPC .......... 269/309–310, 226, 216, 245; 279/134
See application file for complete search history.

(56) References Cited

U.S. PATENT DOCUMENTS

| | | | | |
|---|---|---|---|---|
| 5,172,617 A | * | 12/1992 | Rohm | B23B 31/28 279/110 |
| 6,240,807 B1 | * | 6/2001 | Hebener | B23Q 16/10 269/43 |
| 7,192,018 B2 | * | 3/2007 | Omori | B23Q 1/0009 269/131 |
| 2006/0089089 A1 | * | 4/2006 | Kato | B23Q 1/5437 451/23 |
| 2010/0273597 A1 | * | 10/2010 | Wilson, Jr. | A62B 1/10 475/149 |
| 2011/0155499 A1 | * | 6/2011 | Wilkes | B62D 5/0409 180/444 |
| 2014/0184106 A1 | * | 7/2014 | Kroell | B25B 1/18 318/6 |
| 2016/0164305 A1 | * | 6/2016 | Maurer | H02J 5/005 320/108 |

FOREIGN PATENT DOCUMENTS

| | | |
|---|---|---|
| DE | 36 29 453 | 1/1990 |
| DE | 100 26 829 | 12/2001 |
| DE | 10026829 A1 * | 12/2001 |
| DE | 600 02 417 | 3/2004 |
| EP | 1 114 685 | 7/2001 |
| EP | 1 473 110 | 11/2004 |
| EP | 3028804 A1 * | 12/2004 |
| EP | 2363223 B1 * | 3/2010 |
| EP | 2 650 067 | 10/2013 |
| FR | 2794513 A1 * | 6/1999 |
| WO | WO 8906580 A1 * | 7/1989 |
| WO | WO-2010/037360 | 4/2010 |

OTHER PUBLICATIONS

Schunk superior clamping and gripping manual IM0016148 (see p. 15).*

Extended European Search Report dated Jan. 14, 2015, issued for European Patent Application No. 14181212.3 (No English translation available).

* cited by examiner

CLAMPING UNIT, IN PARTICULAR FOR USE IN A MACHINING CENTER, OR A TURNING OR MILLING CENTER

CROSS-REFERENCE TO RELATED APPLICATIONS

This application claims the benefit of priority to European Application No. 13180673.9, filed on Aug. 16, 2013, which is hereby incorporated by reference in its entirety.

The invention relates to a clamping unit, in particular for use in a machining center, or a turning or milling center, wherein the clamping unit comprises, according to the features of Claim 1, an external housing, preferably having a cylindrical basic design, an internal housing accommodated in the external housing, and an internal cylinder that is retained in the internal housing such that it can be displaced in a vertical adjustment direction A when in the operating state, which is designed for transferring a pressure or tensile force for clamping purposes.

Clamping units for use in a machining center, or a turning or milling center, are already known from the prior art, which are capable of clamping a workpiece to be processed relatively quickly and reliably.

With respect to the prior art, the object of the invention consists of providing a clamping unit that is improved with regard to the application and ensuring of clamping forces.

This object is attained with a clamping unit, in particular for use in a machining center, or a turning or milling center, wherein the clamping unit comprises an external housing, preferably having a cylindrical basic design, an internal housing accommodated in the external housing, and an internal cylinder that is retained such that it can be adjusted in a vertical adjustment direction A when in the operating state, which is designed for transferring a pressure or tensile force for clamping purposes, wherein the internal housing is supported in the external housing by means of springs, and is supported such that it can be displaced in an adjustment direction A with respect to the external housing, thus forming a storage means for spring forces, and wherein an electric motor is disposed inside the clamping unit, integrated therein, preferably encompassed by the external housing, furthermore, preferably accommodated within the internal housing, in order to apply a force in the adjustment direction A to the internal cylinder via drive means disposed therein.

According to a core consideration for the present invention, in this respect a spring force storage unit is implemented, on one hand, in that a displaceable internal housing is supported in the external housing by means of springs, supporting the clamping unit, and thus is supported such that it can be displaced in relation to the external housing in the adjustment direction A, and furthermore, an electric motor is disposed inside the clamping unit, preferably inside the internal housing, in an integrated manner, in order to apply a force in the adjustment direction A to the internal cylinder via drive means disposed therein. By means of this combination, a universally applicable, reliable and simple-to-use clamping unit is created, which can be used—in a rotating application as well—for example, in a machining center, or a turning or milling center. A power source can be implemented, in the case of a clamping unit used in a rotating application, by mean of sliding contacts. Alternatively, it is possible to connect the clamping unit to a power source in a non-rotating operational state, because, at any rate, clamping procedures can only be executed in a non-rotating operational state.

In a preferred design, the drive means comprises a sleeve-shaped screw drive, or a planetary roller screw drive, for transferring a rotational movement of the electric motor into an axial motion applied to the internal cylinder. In a further possible design, the drive means comprises a worm drive having a worm provided at the motor side, and a worm gear provided at the output side.

A design in which the worm gear is connected in a torque-locking manner to a first sub-component of the sleeve-shaped screw drive, provided with an internal threading, in particular such that it is designed as a single-piece construction together therewith, is particularly preferred.

A high gearing ratio can be realized, in the known manner, by means of a worm drive. When the worm drive meshes with the sleeve-shaped screw drive, or the planetary roller screw drive, at the same time, thus, the worm gear is formed on an external circumferential surface of the first sub-component of the sleeve-shaped screw drive or the planetary roller screw drive, it is possible, with only a few components, to convert a rotational movement of an electric motor to an axial movement of the internal cylinder.

In a concrete, possible design, the worm gear comprises an encompassing upper bearing surface and an encompassing lower bearing surface, by means of which it is supported in relation to the internal housing, preferably by means of ball bearings, in a radial and/or axial direction.

In order that the clamping unit can be designed to be relatively flat, it is preferred that the electric motor have a drive shaft that is aligned such that it is orthogonal to the adjustment direction A of the internal cylinder.

For similar reasons, it is preferred, if a worm drive is provided, that the worm is also aligned with an axis S, running orthogonally to the adjustment direction A.

Lastly, it can be advantageous with regard to a compact design of the clamping unit, when a worm drive is provided, if the worm is not connected directly to the drive shaft of the electric motor in an axial manner, but instead, the worm is disposed such that it is orthogonal to the drive shaft of the electric motor. A torque-locking transference of the rotational movement of the drive shaft to the worm can, for example, be effected by means of a gearwheel transmission disposed therebetween.

In a preferred design of the present invention, the internal housing is supported in the external housing by means of numerous springs of different designs, in particular by means of one or more spiral springs, or by means of one or more pneumatic springs. In this construction, which is also claimed as the invention independently of the integration of an electric motor in the clamping unit, the spring characteristics of the specified springs of different designs are combined with one another in a synergetic manner. While a spiral spring only provides a limited counterforce when subjected to small adjustment movements, and provides, conversely, a strong counterforce when subjected to large adjustment movements, a relatively strong counterforce is already generated with a pneumatic spring when subjected to only small adjustment movements. If one then superimposes the spring characteristics of both springs of different designs, in that one uses them in parallel with respect to their modes of action, i.e. with regard to their functionalities, basically such that they are adjacent to one another, then an overall spring characteristic is obtained, which also provides a relatively strong counterforce, even with small adjustment movements, whereas this counterforce increases further when subjected to greater adjustment movements, due to the action of the spiral springs that then takes effect.

In a further possible, preferred design, the internal cylinder has at least one section, preferably a distal section, having a cross-section deviating from the rotational shape, in particular having an elliptical cross-section, in order to fix the internal cylinder in place in relation to the external housing in a non-rotatable manner. Concretely, the internal cylinder having an elliptical cross-section can be guided, for example, through an opening in the external housing having a corresponding elliptical cross-section, such that, by this means, the desired non-rotatable fixing in place is effected.

In an optional possible design, a lock-off device is provided, in order to lock-off the drive means as needed, in particular when the electric motor is at rest.

Although it is possible, with an appropriate design of the worm drive, to already provide a lock-off by means of the worm drive, for safety reasons, or with a design of the worm drive that does not include a lock-off means, the lock-off ensures, in particular when the electric motor is at rest, with a particularly high reliability, that a clamping force that has been generated, and received in the spring force storage unit, is not lost as a result of undesired return movements of the drive means.

In a concrete design, the lock-off device can comprise an axially displaceable pin, which can be brought into engagement, or out of engagement, respectively, with a lock-off recess in the drive means allocated thereto, in particular in a shaft projection on the worm, by means of an actuation device. An axially displaceable pin of this type forms a secure lock-off, because it is merely retained in the lock-off position, but need not be permanently subjected to a retaining force. The actuation device for displacing the axially displaceable pin can be designed as an electromagnetic actuator, which can displace the pin from a first position to a second position, or, respectively, from a second position to a first position. If applicable, the axially displaceable pin can also be acted on by means of a spring, moving it into the lock-off position, such that only when the electric motor, or the drive means, respectively, is actuated, the actuation device is activated in order to guide the axially displaceable pin, counter to the spring force, from the lock-off position to a released position. As soon as the adjustment movement of the clamping cylinder by the electric motor and the drive means is brought to an end, the actuation device can allow the pin to return to the lock-off position under the effects of the aforementioned spring.

In one possible, preferred design, lock-off sensors are also provided, in order to check whether the lock-off device is in the lock-off position. Concretely, it is possible to check which position the axially displaceable pin is in, when the lock-off device comprises an axially displaceable pin.

In a further optional design, sensors are provided, which are designed and intended for indicating or detecting the adjustment position of the internal housing inside the external housing, and by this means, indirectly, the counterforce retained in the spring force storage unit.

Furthermore, sensors can be provided that are designed and intended for detecting the rotational movement of the electric motor, the drive shaft, and/or the drive means, in particular, the respective rotational rate.

Lastly, in a preferred design, the internal housing is designed such that it comprises a housing base element and a housing cover, which are attached to one another by means of releasable connecting elements. In this design, it is particularly simple to assemble the clamping unit, in particular the internal housing having the components accommodated, or supported, therein, such as a worm drive, a sleeve-shaped screw drive having an internal cylinder, an electric motor having a gearwheel drive, and springs.

The invention shall be explained in greater detail below, also with respect to further features and advantages, based on the description of embodiment examples, and with reference to the appended drawings. Shown are:

FIG. 1: an embodiment of the clamping unit according to the invention, in a perspective view.

Figure 2:
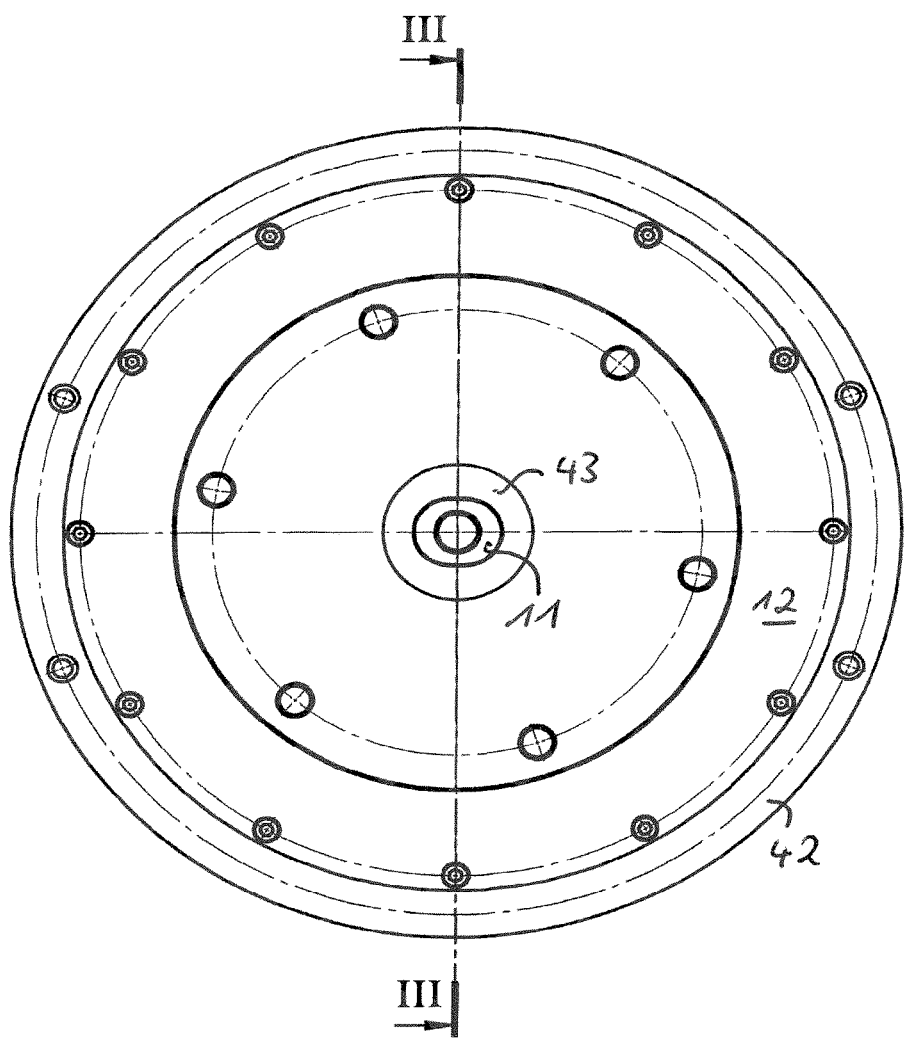

FIG. 2: the clamping unit according to FIG. 1, in a top view.

Figure 3:
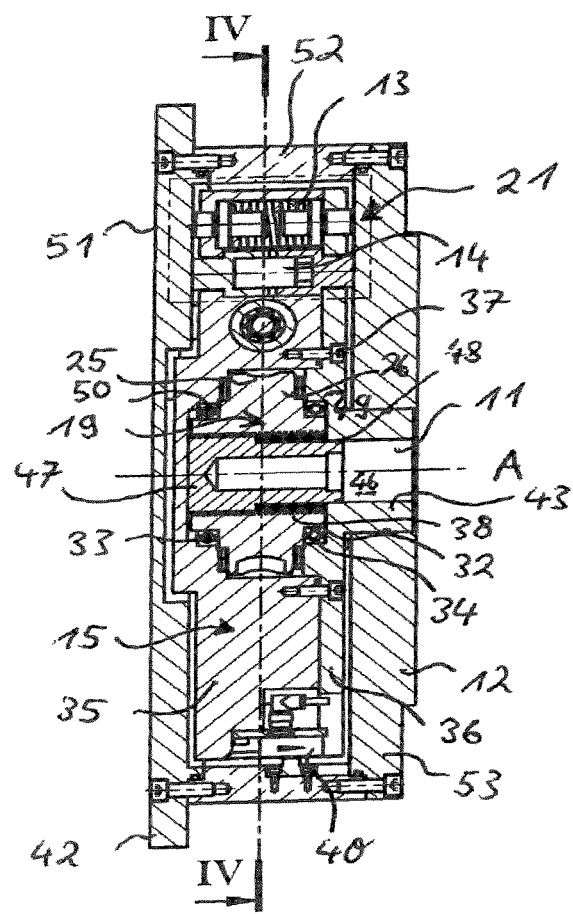

FIG. 3: a cutaway view, cut through the clamping unit according to FIG. 2, along the line III-III in FIG. 2.

Figure 3A:
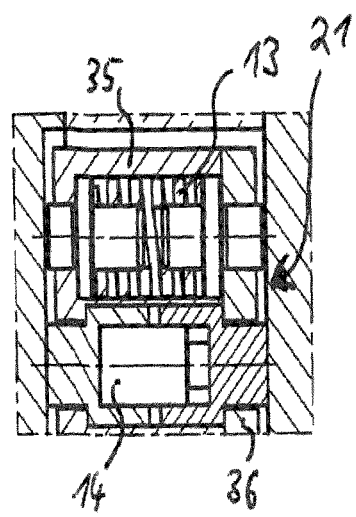

FIG. 3a: a detail view from FIG. 3.

Figure 4:
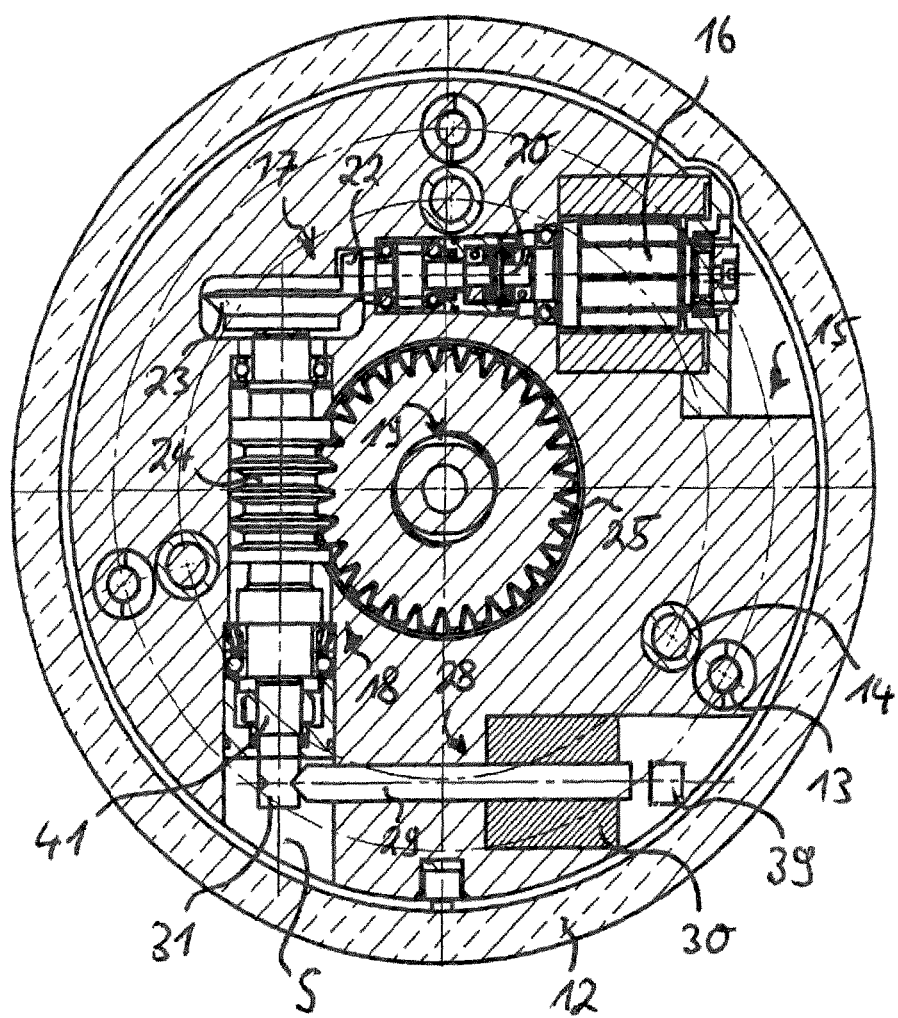

FIG. 4: a cutaway view, cut along the line IV-IV in FIG. 3.

Figure 5:
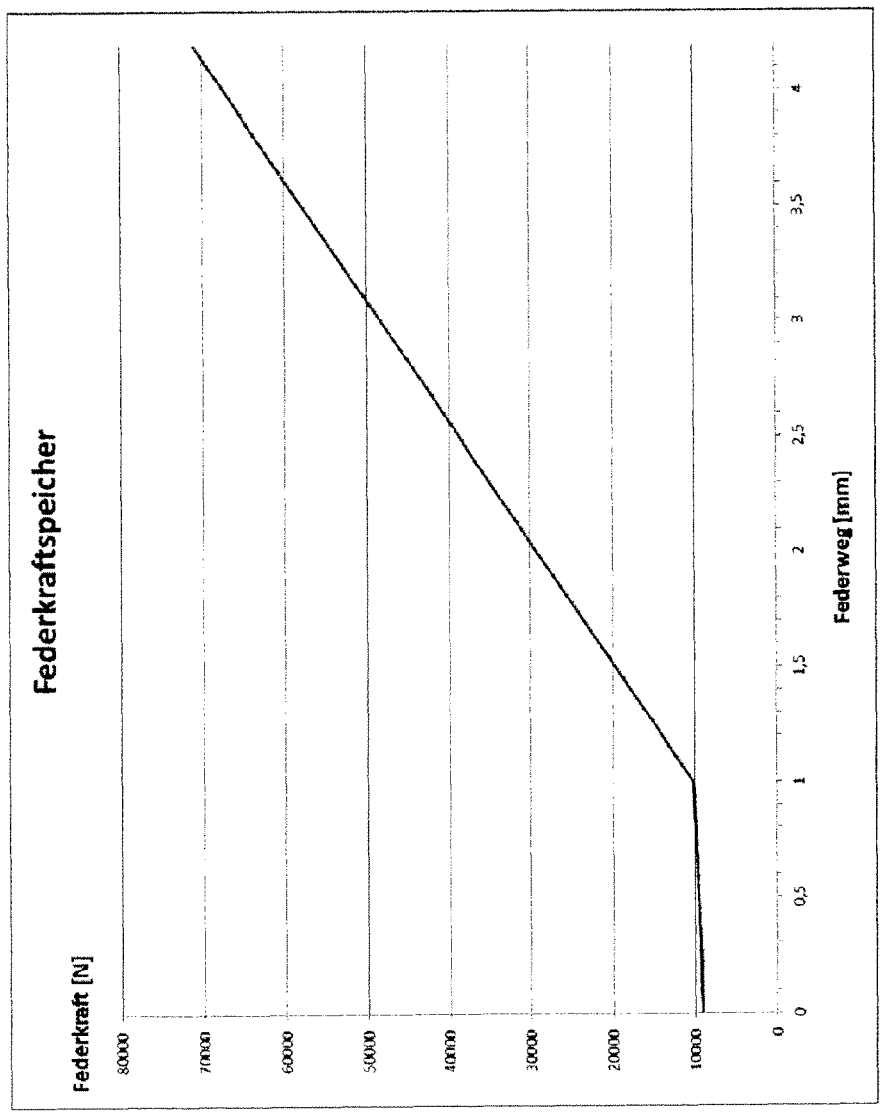

FIG. 5: a diagram for illustrating the springs of different designs acting in parallel to one another, according to another aspect of the present invention, which are superimposed on one another with regard to their spring characteristics.

In FIG. 1, a perspective view of one embodiment of a clamping unit according to the invention is shown, and in FIG. 2, a top view of this embodiment is illustrated. The clamping unit comprises, firstly, an external housing 12, composed of a lower external housing element 51, a middle external housing element 52, and an upper external housing element 53. The lower external housing element 51 forms an attachment flange 42 on is undersurface. At the upper external housing 53, an upper throat section 43 of an internal housing 15 (cf. FIGS. 3 and 4 in this respect) extends into an opening 44 in the upper external housing element 53, or the external housing 12, respectively. The throat section 43 of the internal housing 15 likewise defines an opening 45 having a substantially elliptical cross-section. An internal cylinder 11 is inserted in this opening 45, which has a likewise elliptical cross-section at its distal upper section, adapted to the elliptical shape of the opening 45.

In FIG. 3, a cutaway view, cut along the line III-III in FIG. 2, is depicted. From this cutaway view it is evident how the internal housing 15 is accommodated in the external housing 12. Concretely, it is supported in the external housing 12 by means of springs 13, 14 of different designs, specifically, concretely by means of numerous spiral springs 13, and numerous pneumatic springs 14 (cf. FIG. 4 in this respect), such that the internal housing is supported in a displaceable manner such that it can be displaced in the adjustment direction A, this being, however, counter to the counterforce provided by the springs 13, 14. As a result of the displaceable support of the internal housing 15 in the external housing 12 by means of overcoming the counterforce provided by the springs 13, 14, a spring force storage unit 21 is defined.

In order to guide the internal housing 15 in the external housing 12 along the adjustment direction A, guides can be provided, wherein the guidance, in the present embodiment, is defined by the already specified throat section 43 inside the opening 44 in the external housing 12.

The aforementioned internal cylinder 11 is supported inside the internal housing 15, which is designed such that it can be displaced in the adjustment direction A. The internal cylinder 11 is designed in the present embodiment as a multi-part component, and has a first upper section 46 and a second lower section 47.

On the first, upper section 46, the internal cylinder 11 is provided with the aforementioned elliptical cross-section. The second, lower section 47 of the clamping unit cylinder has, conversely, a circular cross-section, and an external thread 48 on its exterior, at least in sections. The first section 46 and second section 47 can be releasably connected to one another, in particular by means of a screw connection, or in another suitable manner. Alternatively, it is also possible to design the first, upper section 46 and the second, lower section 47 such that they are connected to one another as a single unit.

The external thread 48 provided on the second, lower section 47 engages in a correspondingly designed internal thread 38 in a worm gear 25, which, in this respect, forms a first sub-component of a sleeve-shaped screw drive 19. The second, lower section 47, provided with an external thread 48, forms, accordingly, a second sub-component corresponding to the first sub-component of the sleeve-shaped screw drive 19. The worm gear 25 has a worm toothing on its exterior circumference, which interacts with a worm 24 of a worm drive 18. In order to stabilize the worm gear 25 in the axial and radial directions within the internal housing 15, the worm gear 25 has an upper bearing surface 32 and a lower bearing surface 33, by means of which it is supported via ball bearings 34 on corresponding bearing surfaces 49, 50 of the internal housing 15.

From the cutaway view according to FIG. 3, it is also clear that the internal housing 15 is designed in a multi-part manner, specifically, in the present embodiment, concretely comprising a housing base element 35 and a housing cover 36, wherein the housing base element 35 and housing cover 36 are attached to one another by means of connecting elements 37, in particular connecting screws. As a result of this construction, a simple assembly of the clamping unit is ensured. Specifically, in the assembly process the various individual components, such as the worm gear 25 provided with the internal cylinder 11, the springs 13, 14, and the other components described in reference to FIG. 4, can be placed in the housing base element 35, and at least partially, already fixed in place by means of fixing the housing cover 36 in place, as is the case, for example, at least with the springs 13, 14 and the worm gear 25.

With reference to FIG. 4, it is evident that an electric motor is disposed in the internal housing 15, which transfers a rotational movement to a gearwheel drive 17 by means of a drive shaft 20. The gearwheel drive 17 comprises a motor-side gearwheel 22, and an output-side gearwheel 23, which is connected to the worm 24 of the worm drive 18 in a torque-locking manner. The worm 24 engages with the aforementioned worm gear 25 and initiates a rotational movement of the worm gear when the electric motor 16 is actuated. The worm 24 can be designed such that it acts in a self-limiting manner, i.e. even when an axial force is applied by the internal cylinder 11 to the sleeve-shaped screw drive 19, a rotational movement of the worm gear 25 is prevented. Alternatively, or in addition thereto, a lock-off device 28 having an electromagnetic actuation device 30 can also be provided. An axially displaceable pin 29 is supported in the actuation device 30, which can be guided along its longitudinal axis from the blocking position shown in FIG. 4 to a retracted position, and vice versa. In the blocking position shown in FIG. 4, the axially displaceable pin 29 engages in a recess in a shaft projection 31, which is connected to the worm 24 in a torque-locking manner, and thus blocks the drive means 17-19, in particular the worm 24.

Furthermore, lock-off sensors 39 are provided, by means of which it can be determined whether the axially displaceable pin 29 is located in the lock-off position or in the retracted position.

In the following, a clamping device shall now be described, wherein a clamping device is to be understood as comprising an axial displacement of the internal cylinder 11 in the adjustment direction A, or counter to the adjustment direction A, as well as a displacement of the internal housing 15, through the action of the springs 13, 14, to generate a spring force retained in the spring force storage unit 21 defined in this manner: if the electric motor 16 is brought into rotational movement, the drive shaft 20 drives the worm 24 of the worm drive 18 by means of the gearwheel drive 17, which transfer their rotational movement to the worm gear 25 and thus to the sleeve-shaped screw drive 19. By rotating the first sub-component of the sleeve-shaped screw drive 19 in relation to the second sub-component of the sleeve-shaped screw drive 19, the internal cylinder 11 is displaced axially, in a direction leading out of the external housing 12, for example. If the internal cylinder 11 encounters a counterforce, when the clamping unit interacts with a chuck, for example, and a workpiece already lies in the clamping jaws of the chuck, then the internal cylinder 11 is subjected to a further force, such that the force, by means of which the workpiece is clamped, is increased. In doing so, a further force, acting on the internal cylinder 11 toward the exterior of the internal housing 15, acts such that the internal housing 15 is displaced inside the external housing 12, counter to the action of the springs 13, 14 in the opposite direction, and thus, a counterforce is generated in the spring force storage unit 21. The displacement movement of the internal housing 15 in relation to the external housing 12 can be detected by sensors 40, and thus, indirectly, the counterforce set in the spring force storage unit 21, can also be detected. If a desired force has been reached, the electric motor 16 is shut down, and the drive means 17-19 are blocked, either by means of the self-lock-off provided by the worm 24, and/or via the previously specified lock-off means 39.

In order to detect the rotational movement of the electric motor 16, the output shaft 20, or the drive means 17-19, sensors 41 can be provided, which detect, by way of example, complete rotations by means of suitable sensor technology, using the Hall effect, for example.

It is evident, in reference to FIG. 5, how the various springs 13, 14 of different designs are superimposed in terms of the spring characteristics, such that already with a smaller displacement (spring movement), a relatively large counterforce (spring force) is provided, wherein this force, in the case of small displacements (spring movements) is mainly assumed by the pneumatic springs. With larger displacements (spring movements), the spiral springs are brought into play, such that, starting at a certain spring movement, a significantly increasing spring force is obtained. It is to be understood that, by means of a suitable combination of the spring characteristics of pneumatic springs and spiral springs, a desired spring characteristic can be established to a greater degree.

The proposed clamping unit is extremely compact in its construction, and enables clamping procedures to be executed quickly, reliably, and safely.

LIST OF REFERENCE SYMBOLS

11 Internal cylinder
12 external housing
13 spring, spiral spring
14 spring, pneumatic spring
15 internal housing
16 electric motor
17 drive means, gearwheel drive 18 drive means, worm drive
19 drive means, sleeve-shaped screw drive
20 output shaft (motor)
21 spring force storage unit
22 motor-side gearwheel
23 output-side gearwheel
24 worm
25 worm gear
28 lock-off device
29 axially displaceable pin
30 actuation device
31 shaft projection
32 upper bearing surface
33 lower bearing surface
34 ball bearings
35 housing base element
36 housing cover
37 connecting element
38 internal thread
39 lock-off sensor
40 sensors (spring force storage unit)
41 sensors (electric motor, drive means)
42 attachment flange
43 throat section
44 opening (external housing)
45 opening (throat section of the internal housing)
46 first, upper section
47 second, lower section
48 external thread
49, 50 bearing surfaces
51 lower external housing element
52 middle external housing element
53 upper external housing element

The invention claimed is:

1. A clamping unit for use in a machining center, or a turning or milling center, comprising:
an external housing,
an internal housing accommodated in the external housing, and
an internal cylinder held in the internal housing, the internal cylinder being displaceable in a first vertical adjustment direction in an operating state, the operating state being designed for transferring a pressure or tensile force for clamping purposes,
wherein the internal housing is supported in the external housing by springs, and the internal housing being supported with respect to the external housing such that the internal housing is displaceable in the first vertical adjustment direction, thereby forming a spring force storage unit, and
wherein an electric motor is disposed inside the clamping unit, integrated therein, accommodated inside the internal housing, in order to apply a force in the first vertical adjustment direction to the internal cylinder via a drive means disposed therebetween.

2. The clamping unit according to claim 1, wherein the drive means comprises at least one of a sleeve-shaped screw drive and a planetary roller screw drive, the drive means configured to transfer a rotational movement of the electric motor into an axial motion applied to the internal cylinder.

3. The clamping unit according to claim 1, wherein the drive means comprises a worm drive having a worm provided at a motor side of the worm drive proximate the electric motor, and the worm drive further having a worm gear provided at an output side of the worm drive, the output side opposite the motor side.

4. The clamping unit according to claim 3, wherein the worm gear is connected in a torque-locking manner to a first sub-component of a sleeve-shaped screw drive, or of a planetary roller screw drive, wherein the first sub-component is provided with an internal thread.

5. The clamping unit according to claim 4, wherein the worm gear is designed as a single unit together with the first sub-component.

6. The clamping unit according to claim 3, wherein the worm gear comprises a circumferential upper bearing surface and a circumferential lower bearing surface.

7. The clamping unit according to claim 6, wherein each of the circumferential upper bearing surface and circumferential lower bearing surface support the worm gear in relation to the internal housing in at least one of a radial direction and an axial direction via ball bearings.

8. The clamping unit according to claim 3, wherein the worm of the worm drive is aligned with a first axis, the first axis running orthogonally to the first vertical adjustment direction.

9. The clamping unit according to claim 8, wherein an output shaft of the electric motor is aligned orthogonally to the first axis of the worm in the worm drive.

10. The clamping unit according to claim 1, wherein the electric motor has an output shaft, disposed orthogonally to the first vertical adjustment direction.

11. The clamping unit according to claim 1, wherein the internal housing is supported in the external housing by a plurality of springs the plurality of springs including first and second springs, the first spring being a first spring type and the second spring being a second spring type.

12. The clamping unit according to claim 11, wherein the first spring type is a spiral spring and the second spring type is a gas spring.

13. The clamping unit according to claim 1, wherein the internal cylinder has at least one section having a cross-section deviating from a rotational shape.

14. The clamping unit according to claim 13, wherein the cross-section of the internal cylinder is an elliptical cross-section, the elliptical cross-section being shaped to fix the internal cylinder in place, such that the internal cylinder cannot rotate in relation to the external housing.

15. The clamping unit according to claim 13, wherein a distal section of the internal cylinder has a cross-section deviating from the rotational shape.

16. The clamping unit according to claim 1, further comprising a lock-off device for locking off the drive means when the electric motor is at rest.

17. The clamping unit according to claim 16, wherein the lock-off device comprises an axially displaceable pin, which can be brought into engagement, or out of engagement, respectively, by means of an actuating device, with a lock-off recess in the drive means.

18. The clamping unit according to claim 17, wherein the lock-off recess in the drive means is allocated to a shaft projection on a worm.

19. The clamping unit according to claim 16, further comprising a lock-off sensor configured to check whether the lock-off device is in a lock-off setting.

20. The clamping unit according to claim 1, further comprising sensors configured to perform at least one of indicating and detecting of an adjustment position of the internal housing inside the external housing.

21. The clamping unit according to claim 20, wherein counterforce retained in the spring force storage unit is determined based on a detecting of the adjustment position.

22. The clamping unit according to claim 1, further comprising sensors configured to detect rotational movement of at least one of the electric motor, an output shaft, and the drive means.

23. The clamping unit according to claim 22, wherein a sensor is configured to detect a rotational rate of at least one of the electric motor, the output shaft, and the drive means.

24. The clamping unit according to claim 1, wherein the internal housing comprises a housing base element and a housing cover, the housing base element and the housing cover being attached to one another by releasable connecting elements.

25. The clamping unit according to claim 1, wherein the external housing is cylindrical.

* * * * *